(12) United States Patent
Kaertner et al.

(10) Patent No.: US 7,256,940 B2
(45) Date of Patent: Aug. 14, 2007

(54) MULTI-LAYER THIN-FILM BROADBAND BEAM SPLITTER WITH MATCHED GROUP DELAY DISPERSION

(75) Inventors: Franz X. Kaertner, Newton, MA (US); Jung-Won Kim, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 77 days.

(21) Appl. No.: 11/125,457

(22) Filed: May 10, 2005

(65) Prior Publication Data

US 2005/0280895 A1    Dec. 22, 2005

Related U.S. Application Data

(60) Provisional application No. 60/570,304, filed on May 12, 2004.

(51) Int. Cl.
*G02B 1/10*    (2006.01)
*G02B 5/30*    (2006.01)

(52) U.S. Cl. ..................................... 359/583; 359/487

(58) Field of Classification Search ................ 359/583, 359/495, 498, 487
See application file for complete search history.

(56) References Cited

U.S. PATENT DOCUMENTS 5,828,489 A * 10/1998 Johnson et al. ............. 359/487
7,012,747 B2 * 3/2006 Kagawa et al. ............. 359/487

OTHER PUBLICATIONS

"The Practical Application of Light: Ultrafast Polarizers for Femtosecond Laser Applications," 1999 Melles Griot Catalog, pp. 14.22-14.23.
Tikhonravov et al. "Designing of coatings for femtosecond lasers with phase derivatives targets," May 1999, vol. 3738, pp. 221-229.
Pashotta R. "Group Delay dispersion-Group Velocity Dispersion" Encyclopedia of Laser Physics and Technology, pp. 7-8.
Kim et al. "Ultrabroadband beam splitter with matched group-delay dispersion" Optics Letters, vol. 30, No. 12, pp. 1569-1571.

* cited by examiner

*Primary Examiner*—Audrey Chang
(74) *Attorney, Agent, or Firm*—Gauthier & Connors LLP

(57) ABSTRACT

A beam splitter includes a substrate. A thin film layer stack is formed on the substrate to achieve the same group delay dispersion (GDD) for both reflection and transmission from any input port and output port of said beam splitter.

14 Claims, 5 Drawing Sheets

MULTI-LAYER THIN-FILM BROADBAND BEAM SPLITTER WITH MATCHED GROUP DELAY DISPERSION

PRIORITY INFORMATION

This application claims priority from provisional application Ser. No. 60/570,304 filed May 12, 2004, which is incorporated herein by reference in its entirety.

This invention was made with government support under Grant Number N00014-02-1-0717 awarded by the U.S. Navy. The government has certain rights in the invention.

BACKGROUND OF THE INVENTION

The invention relates to the field of beam splitters and in particular to broadband beam splitters with matched group delay dispersion for all input and output ports.

Beam splitters are essential devices in the entire field of optics. They are used to combine or split optical beams at the same wavelength or with different wavelength. Specifically, broadband beam splitters are important in ultrafast optics to combine and split ultrashort optical pulse streams without spectral or spatial distortions. The conventional techniques for very broadband beam splitter are either based on thin metal layer or dielectric multi-layer thin-film structures.

Metallic beam splitters consist of a thin metal layer such as gold, aluminum or silver that is deposited on a glass or similar material substrate. Although metallic beam splitters have a broad operating wavelength range and are widely used for ultrafast optics applications, they show considerable loss and strong wavelength dependence in reflection and transmission owing to the wavelength dependent penetration depth into the metal. Conventional dielectric beam splitters based on quarter-wave Bragg stacks cannot support such broad spectra. For high quality pulse synthesis or splitting, it is highly desirable to design a broadband beam splitter based on multi-layer dielectric thin-film coatings deposited on a stable substrate.

SUMMARY OF THE INVENTION

According to one aspect of the invention, there is provided a beam splitter. The beam splitter includes a substrate. A thin film layer stack is formed on the substrate to achieve the same group delay dispersion (GDD) for both reflection and transmission from any input port and output port of the beam splitter.

According to another aspect of the invention, there is provided a method forming a beam splitter. The method includes forming a substrate. The method includes forming a thin film stack on the substrate to achieve the same group delay dispersion (GDD) for both reflection and transmission from any input port and output port of the beam splitter.

DETAILED DESCRIPTION OF THE INVENTION

The invention is a new design for an ultra-broadband beam splitter. The invention is able to achieve the same group delay dispersion (GDD) for both reflection and transmission from any input ports to the output ports. In addition, this GDD is equal to the dispersion of a thin fused silica plate, which can be easily compensated either before or after the beam splitter. This condition can be achieved when the group delay dispersion (GDD) for reflection from the coating is matched with the GDD for a single pass in the substrate. In this condition, the GDD for any combination of input and output can be matched over the whole wavelength range.

Figure 1:
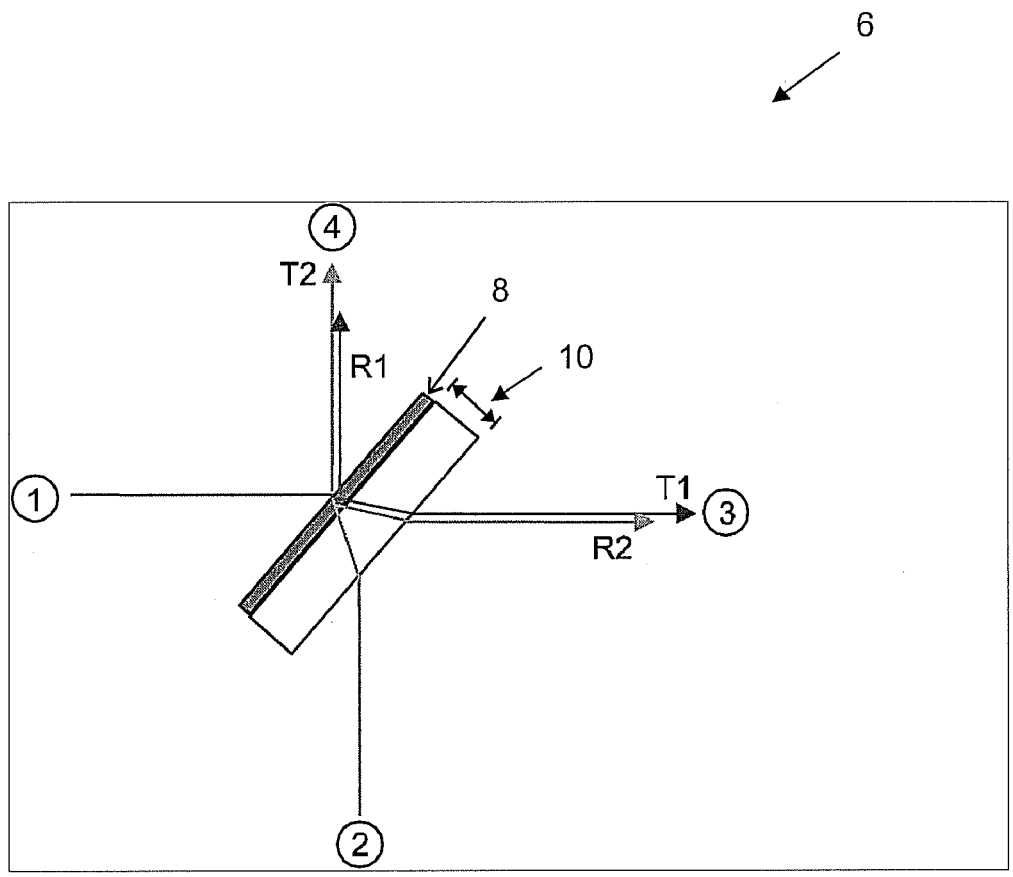
FIG. 1 is a schematic diagram of an ultra-broadband 50:50 beam splitter with matched group delay dispersion.

FIG. 1 shows the schematic of a beam splitter 6. Let us denote the group delay dispersion (GDD) of the coating 8 between the air and the substrate 10 interfaces with reflection R1 (from port 1 to 4 in FIG. 1), transmission T1 (from port 1 to 3 in FIG. 1), reflection R2 (from port 2 to 3 in FIG. 1), and transmission T2 (from port 2 to 4 in FIG. 1) by $GDD_{R1}$, $GDD_{T1}$, $GDD_{R2}$, and $GDD_{T2}$, respectively. In the design we will match the group delay dispersion for a single-pass in the substrate 10, $GDD_S$, with that of the coating 8 reflection, i.e. $GDD_S = GDD_{R1}$. The GDD for each optical path through the total beam splitter 6, i.e. coating 8 plus substrate 10, is then given by: GDD (1→4)= $GDD_{R1}$=$GDD_S$, GDD (1→3)=$GDD_{T1}$+$GDD_S$, GDD (2→3)=$GDD_{R2}$+2$GDD_S$, and GDD (2→4)=$GDD_{T2}$+$GDD_S$.

For the lossless coating 8 of the beam splitter 6, the following relationships are generally valid in FIG. 1: $GDD_{T2}$=$GDD_{T1}$ and $GDD_{R2}$=2$GDD_{T1}$−$GDD_{R1}$. Over the wavelength range of constant transmission, which is the condition we aim to achieve for broadband beam splitter 6, the GD for transmission through the coating 8, $GD_{T1}$, is almost constant because the transmission through a dielectric coating 8 is subject to Kramers-Kroenig relation. Therefore, the corresponding GDD is negligible: $GDD_{T1}$≈0.

With these additional conditions for a lossless and constant transmission coating, the group delay dispersion for each beam path becomes identical: GDD (1→4)=$GDD_S$, GDD (1→3)=$GDD_{T1}$+$GDD_S$=$GDD_S$, GDD (2→3)= $GDD_{R2}$+2$GDD_S$=2$GDD_{T1}$−$GDD_{R1}$+2$GDD_S$=$GDD_S$, and GDD (2→4)=$GDD_{T2}$+$GDD_S$=$GDD_S$.

Thus, the GDD from any input to any output is matched with the GDD from a single pass in the substrate 8, $GDD_S$.

Figure 2:
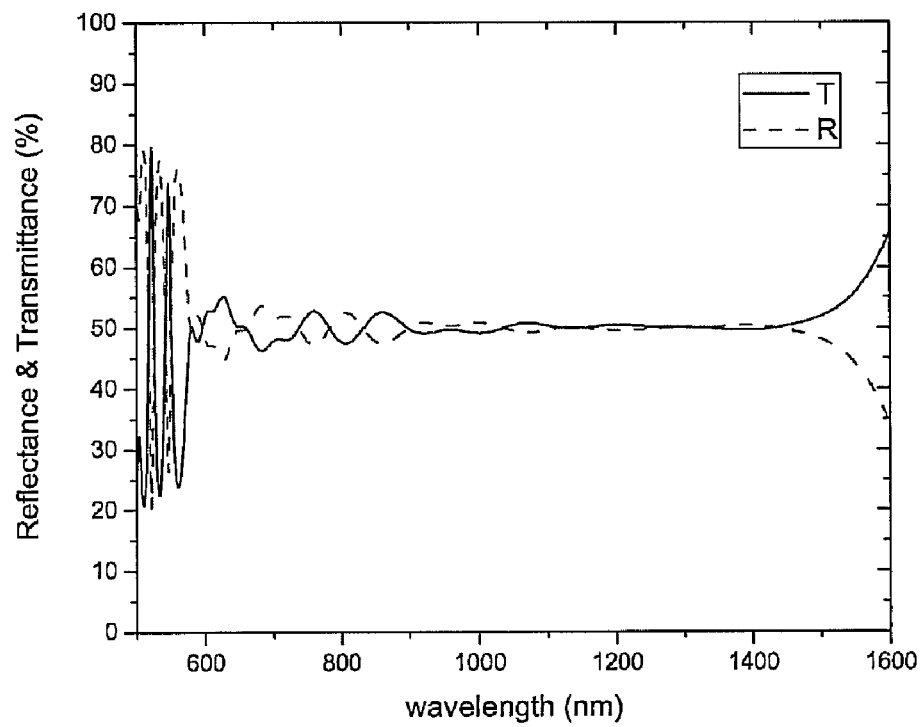
FIG. 2 is a graph demonstrating the reflectance and transmittance of the coating as a specific design example.
Figure 3:
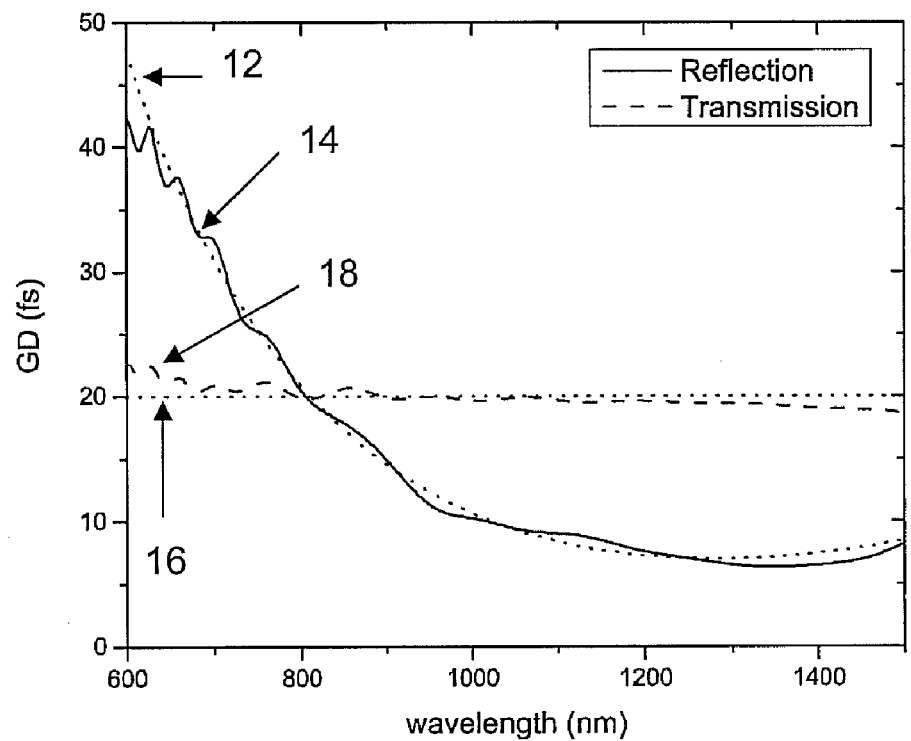
FIG. 3 is graph demonstrating the group delay in reflection and transmission of the coating as a specific design example.

For a specific device demonstration based on the design strategy described above, we designed an ultrabroadband 50:50 beam splitter covering the spectral range of 600 nm to 1500 nm. The design is carried out for p-polarized light with a 45° angle of incidence. The dielectric multi-layer thin film coating 8 is deposited on a fused silica substrate 10. The fused silica substrate 10 used in the design is about 655 μm thick, equal to a 750 μm (=655/cos(29.2°)) optical path length in the substrate 10 for 45° angle of incidence. The optimized coating 8 consists of 38 layers of $TiO_2$ (n≈2.4) and $SiO_2$ (n≈1.48) on a fused silica substrate 10, and the total coating 8 thickness is 3.54 μm. FIG. 2 shows the designed reflectance/transmittance. The designed reflectance and transmittance are within (50±5) % from 600 to 1500 nm. FIG. 3 shows the designed GD in reflection and transmission from the coating 8. The GD in coating 8 reflection (shown in graph 14) is matched with that of the 750 μm optical path length of the fused silica substrate up to a constant (shown in graph 12), within ±1 fs from 650 to 1500 nm. Graphs 12 and 14 demonstrate that the GDD in reflection from the coating is well matched with that of the substrate. The GD in coating transmission (Graph 18) is constant centered at 20 fs (Graph 16) within ±1 fs from 650 to 1500 nm.

Figure 4:
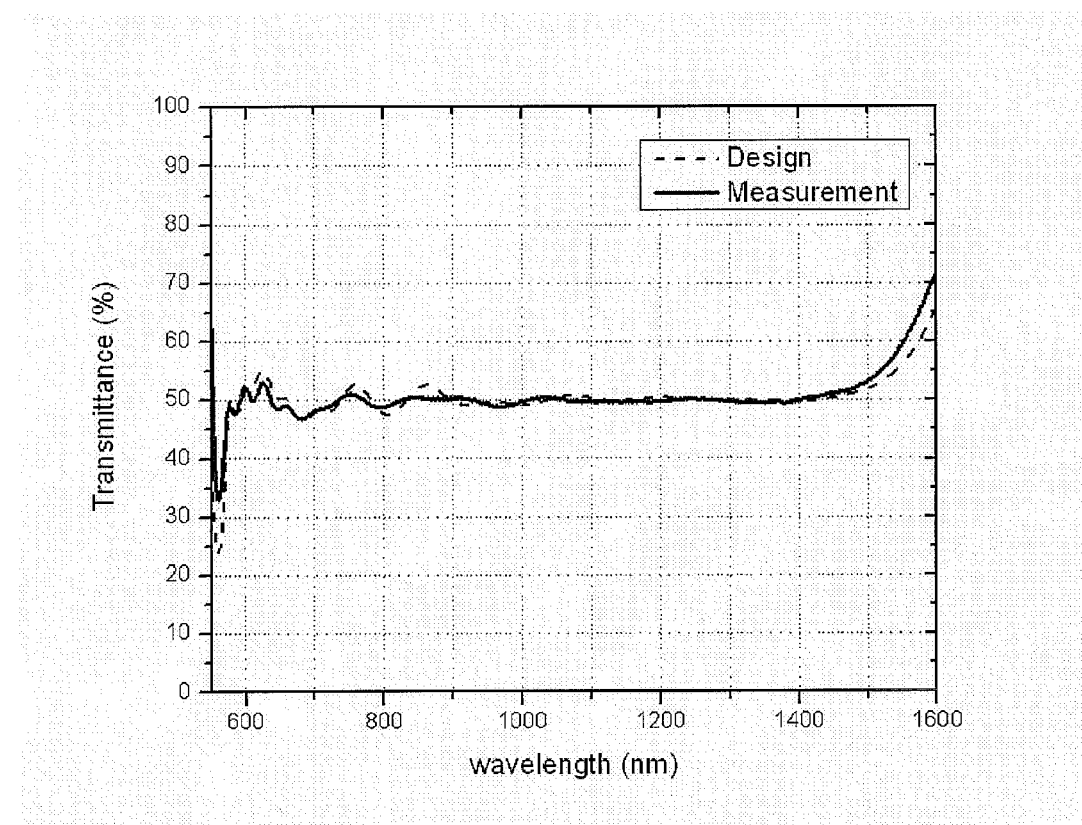
FIG. 4 is a graph demonstrating the measured transmittance of the beam splitter as a specific beam splitter example.

FIG. 4 shows the designed and measured transmittance of a fabricated beam splitter. The transmittance was measured by a spectrophotometer under 45° angle of incidence. The design and measurement show excellent agreement.

Figure 5:
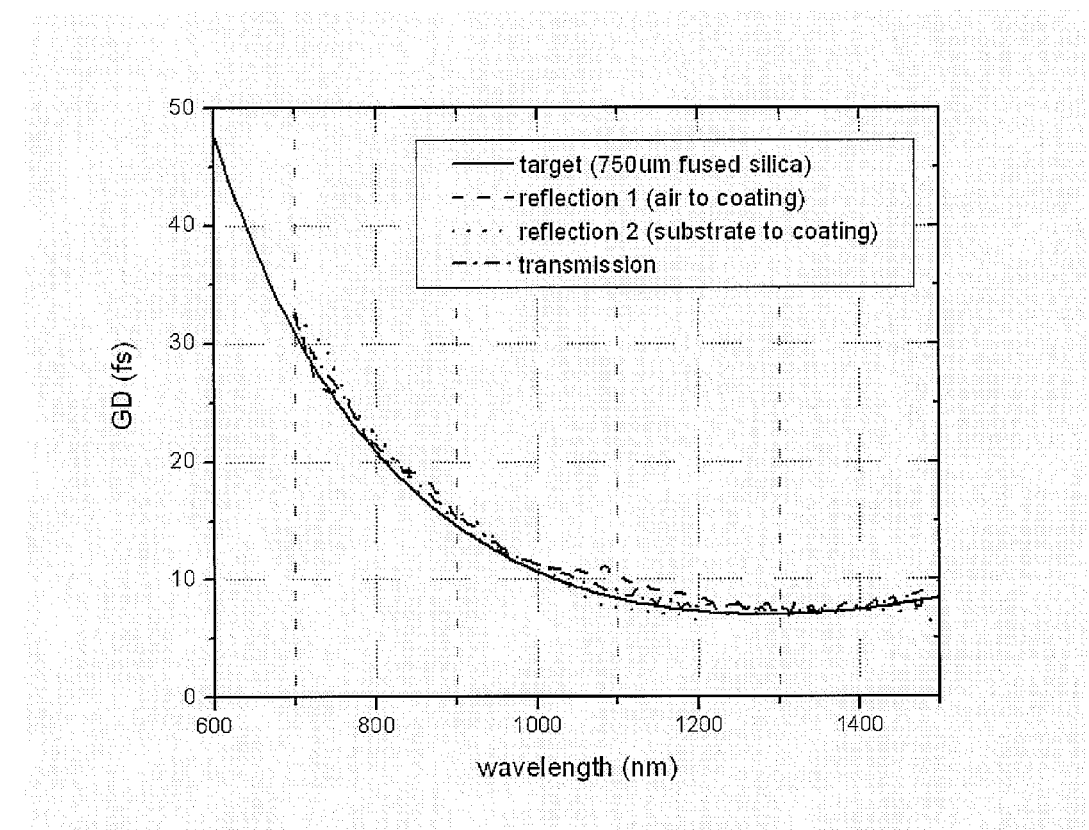
FIG. 5 is a graph demonstrating the measured group delay of the beam splitter as a specific beam splitter example.

The GDs and corresponding GDDs were measured by a white light interferometer. FIG. 5 shows the collection of all measured GDs for three possible cases: (i) reflection from air side to coating; (ii) reflection from substrate side to coating; (iii) transmission through coating and substrate. Since the measurements always involve two reflections or transmissions, we divided the measurement results by 2 when compared with the design. In addition, for an easy comparison with the design, we shifted the measured GD curves by a constant amount. The measurements were limited on the short wavelength side at 700 nm by the blocking filter for the 633 nm light from the He—Ne laser used for interferometer calibration. For all cases shown, the measured GDs and the corresponding GDDs show excellent agreement with the design.

Although the present invention has been shown and described with respect to several preferred embodiments thereof, various changes, omissions and additions to the form and detail thereof, may be made therein, without departing from the spirit and scope of the invention.

What is claimed is:

1. A beam splitter comprising:
   a substrate; and
   a thin film stack that is formed on said substrate to achieve the same group delay dispersion (GDD) for both reflection and transmission from any input port and to any output port of said beam splitter, said GDD is equal to the group delay dispersion of said substrate when the group delay dispersion (GDD) for reflection from the thin film stack is matched with the GDD for a single pass in the substrate, said thin film stack comprising a multilayer structure.

2. The beam splitter of claim 1, wherein said substrate comprises fused silica, calcium fluoride, or barium fluoride.

3. A beam splitter of claim 2, wherein a splitting ratio is more than 50%.

4. The beam splitter of claim 1, wherein said substrate comprises fused silica and is approximately 655 μm thick.

5. The beam splitter of claim 1, wherein said thin-film comprises a coating of 38 layers of $TiO_2$ and $SiO_2$.

6. The beam splitter of claim 5, wherein said coating comprises a total thickness of 3.54 μm.

7. A beam splitter of claim 1 further comprising a splitting ratio of 50%.

8. A method forming a beam splitter comprising:
   providing a substrate;
   forming a thin film stack on said substrate to achieve the same group delay dispersion (GDD) for both reflection and transmission from any input port and to any output port of said beam splitter, said GDD is equal to the group delay dispersion of said substrate when the group delay dispersion (GDD) for reflection from the thin film stack is matched with the GDD for a single pass in the substrate, said thin film stack comprising a multilayer structure.

9. The method of claim 8, wherein said substrate is fused silica, calcium fluoride, or barium fluoride.

10. A method of claim 9, wherein a splitting ratio is more than 30%.

11. The method of claim 8, wherein said substrate is-comprises fused silica and is approximately 655 μm thick.

12. The method of claim 8, wherein said thin-film comprises a coating of 38 layers of $TiO_2$ and $SiO_2$.

13. The method of claim 12, wherein said coating comprises a total thickness of 3.54 μm.

14. A method of claim 8, further comprising a splitting ratio of 50%.

* * * * *